US012767840B2

(12) United States Patent
Nakagawa et al.

(10) Patent No.: US 12,767,840 B2
(45) Date of Patent: Oct. 20, 2026

(54) INKJET INK

(71) Applicant: Nippon Kayaku Kabushiki Kaisha, Tokyo (JP)

(72) Inventors: Yuri Nakagawa, Tokyo (JP); Junya Masegi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 117 days.

(21) Appl. No.: 18/840,263

(22) PCT Filed: Mar. 24, 2023

(86) PCT No.: PCT/JP2023/011826
§ 371 (c)(1),
(2) Date: Aug. 21, 2024

(87) PCT Pub. No.: WO2023/190162
PCT Pub. Date: Oct. 5, 2023

(65) Prior Publication Data

US 2025/0179318 A1 Jun. 5, 2025

(30) Foreign Application Priority Data

Mar. 31, 2022 (JP) ................................ 2022-060125

(51) Int. Cl.
*C09D 11/322* (2014.01)
*C09C 1/36* (2006.01)

(52) U.S. Cl.
CPC .......... *C09D 11/322* (2013.01); *C09C 1/3692* (2013.01)

(58) Field of Classification Search
CPC ....... C09D 11/322; C09D 11/38; C09D 11/40; C09D 11/30; C09D 11/037; C09D 11/326; C09D 123/10; C09D 123/142; B41M 5/0023; B41M 5/0011; B41J 2/2107; B41J 2/01; B41J 2/2117
See application file for complete search history.

(56) References Cited

U.S. PATENT DOCUMENTS

| | | | | |
|---|---|---|---|---|
| 9,062,228 | B2 * | 6/2015 | Roberts | C08G 18/3872 |
| 2005/0282946 | A1 | 12/2005 | Lin et al. | |
| 2007/0259986 | A1 * | 11/2007 | Elwakil | C09D 11/40 522/83 |
| 2009/0009577 | A1 * | 1/2009 | Nigam | B41M 7/0045 347/105 |
| 2010/0133728 | A1 * | 6/2010 | Yonezawa | G03F 7/0002 522/182 |
| 2014/0002556 | A1 * | 1/2014 | Sato | C09D 11/30 524/265 |
| 2014/0363642 | A1 | 12/2014 | Kawaguchi et al. | |
| 2015/0064398 | A1 * | 3/2015 | Umebayashi | C09D 11/54 428/137 |
| 2015/0218398 | A1 * | 8/2015 | Loccufier | C09D 11/38 522/18 |
| 2016/0083604 | A1 * | 3/2016 | Steert | B41J 2/2117 347/73 |
| 2017/0029639 | A1 * | 2/2017 | Loccufier | B01J 13/06 |
| 2017/0218565 | A1 * | 8/2017 | Loccufier | D06P 1/44 |
| 2018/0079921 | A1 * | 3/2018 | Okamoto | C09D 11/328 |
| 2018/0105714 | A1 | 4/2018 | Kasperchik et al. | |
| 2022/0073776 | A1 | 3/2022 | Inoue et al. | |
| 2023/0092800 | A1 | 3/2023 | Hongo et al. | |
| 2023/0416547 | A1 * | 12/2023 | Loccufier | B41M 7/0081 |
| 2024/0059917 | A1 * | 2/2024 | Asakawa | B41J 11/002 |

FOREIGN PATENT DOCUMENTS

| | | | |
|---|---|---|---|
| EP | 2927287 | A1 | 10/2015 |
| EP | 2781565 | B1 | 4/2018 |
| JP | 2006-037080 | A | 2/2006 |
| JP | 2014-040553 | A | 3/2014 |
| JP | 2018-009260 | A | 1/2018 |
| JP | 2019-065246 | A | 4/2019 |
| JP | 2020-125381 | A | 8/2020 |
| JP | 2022-001610 | A | 1/2022 |
| WO | WO 2013/115071 | A1 | 8/2013 |
| WO | WO 2020/230246 | A1 | 11/2020 |
| WO | WO 2021/221069 | A1 | 11/2021 |

OTHER PUBLICATIONS

Extended European Search Report issued in European Patent Application No. 23780172.5, dated Jun. 30, 2025, in 7 ages.

* cited by examiner

*Primary Examiner* — John P Zimmermann
(74) *Attorney, Agent, or Firm* — Knobbe, Martens, Olson & Bear, LLP

(57) ABSTRACT

An inkjet ink containing a white pigment, a block polymer-type resin dispersant, an organic solvent, and water, in which the white pigment is titanium oxide particles in which the surface is treated with alumina, excluding particles in which the surface is treated with an organic compound, silica, zirconia, zinc oxide, or magnesium oxide, and titanium oxide particles in which the surface is treated with alumina and an organic compound.

8 Claims, No Drawings

INKJET INK

This application is the U.S. National Phase under 35 U.S.C. § 371 of International Application PCT/JP2023/011826, filed Mar. 24, 2023, designating the U.S., and published in Japanese as WO 2023/190162 on Oct. 5, 2023, which claims priority to Japanese Patent Application No. 2022-060125, filed Mar. 31, 2022; the entire content of which is incorporated herein by reference.

TECHNICAL FIELD

The invention relates to an inkjet ink, an inkjet recording method using the inkjet ink, and a recorded medium on which the inkjet ink has been adhered.

BACKGROUND ART

A recording method with an inkjet printer (inkjet recording method) is a method in which small droplets of ink are generated and adhered to various recording media (e.g., a piece of paper, film, or cloth). In recent years, demand for inkjet printing in industrial applications has also increased.

A white ink is often used to hide a color of a substrate itself or background and make a printed image more visible when printing on a piece of corrugated paper, cloth, a transparent recording medium, etc. Titanium oxide has the highest hiding rate among white pigments for use in the white ink, but it has a problem of large specific gravity and is thus prone to sedimentation. Furthermore, the larger a particle size of titanium oxide is, the higher the hiding rate tends to be due to a densification effect. However, dispersion stability deteriorates as the hiding rate increases, which is problematic.

CITATION LIST

Patent Document

Patent Document 1: PCT International Publication No. WO2013/115071

Patent Document 2: Japanese Unexamined Patent Application, Publication No. 2019-065246

DISCLOSURE OF THE INVENTION

Problems to be Solved by the Invention

An object of the present invention is to provide an inkjet ink with an excellent hiding property and dispersion stability, an inkjet recording method using the inkjet ink, and a recorded medium on which the inkjet ink has been adhered.

Means for Solving the Problems

Specific means for achieving the above-mentioned object include the following embodiments.

1) An inkjet ink including:

a white pigment;

a block polymer type resin dispersing agent;

an organic solvent; and water, the white pigment being at least one kind of titanium oxide particles selected from the group consisting of titanium oxide particles having surfaces treated with alumina (excluding titanium oxide particles having surfaces treated with an organic compound, silica, zirconia, zinc oxide, or magnesium oxide), and titanium oxide particles having surfaces treated with alumina and an organic compound.

2) The inkjet ink according to 1), in which the block polymer type resin dispersing agent has a weight average molecular weight of 15000 to 25000.

3) The inkjet ink according to 1) or 2), in which the inkjet ink includes particles in which at least a portion of a surface of the white pigment is coated with the block polymer type resin dispersing agent, and the particles have an average particle size of 200 to 400 nm.

4) An inkjet recording method including:

recording by ejecting droplets of the inkjet ink according to any one of 1) to 3) from an inkjet printer and adhering the droplets to a recording medium.

5) The inkjet recording method according to 4), in which the recording medium is a less ink-absorbent or non-ink-absorbent recording medium.

6) The inkjet recording method according to 5), in which the recording medium is a recording medium subjected to at least one surface modification treatment selected from the group consisting of a corona discharge treatment, a plasma treatment, and a flame treatment.

7) A recorded medium on which the inkjet ink according to any one of 1) to 3) has been adhered.

8) An inkjet printer including a container containing the inkjet ink according to any one of 1) to 3).

9) A method for producing the inkjet ink according to 3), the method including coating at least the portion of the surface of the white pigment with the block polymer type resin dispersing agent.

Effects of the Invention

The present invention can provide an inkjet ink with an excellent hiding property and dispersion stability, an inkjet recording method using the inkjet ink, and a recorded medium on which the inkjet ink has been adhered.

Preferred Mode for Carrying Out the Invention

Specific embodiments to which the present invention is applied will be described in detail. As used herein, unless otherwise stated, the notation "x to y" with numerical values z and y shall mean "x or more and y or less". When only the numerical value y is described with its unit in such a notation, the unit shall also be applied to the numerical value x. As used herein, the term "alkylene", "propylene", or "alkyl" is used in the sense of encompassing both linear and branched chain structures, unless otherwise stated. Furthermore, as used herein, the term "(meth)acryl" means both "acryl" and "methacryl". Similarly, the term "(meth)acrylate" means both "acrylate" and "methacrylate".

<Inkjet Ink>

An inkjet ink according to the present embodiment (hereinafter also simply referred to as "ink") includes a white pigment, a block polymer type resin dispersing agent, an organic solvent, and water, the white pigment being at least one kind of titanium oxide particles selected from the group consisting of titanium oxide particles having surfaces treated with alumina (excluding titanium oxide particles having surfaces treated with an organic compound, silica, zirconia, zinc oxide, or magnesium oxide), and titanium oxide particles having surfaces treated with alumina and an organic compound.

The ink according to the present embodiment has an excellent hiding rate and excellent dispersion stability. The ink according to the present embodiment also has an excellent image forming property, with less coating unevenness during image formation. The phrase "excellent dispersion stability" means that a sedimentation rate of a white pigment is slow. As shown in Stokes' law, a sedimentation rate depends on an ink viscosity, so a value obtained by multiplying the sedimentation rate by the ink viscosity can be used to compare and evaluate dispersion stability. In addition, the ink according to the present embodiment also has a property that a white pigment is easily redispersed even if it is sedimented. The ink according to the present embodiment also has excellent tackiness.

Components contained in the ink according to the present embodiment will be described. Note that, one of the components may be used alone, or two or more of the components may be used in combination.

[White Pigment]

A white pigment is at least one kind of titanium oxide particles selected from the group consisting of titanium oxide particles having surfaces treated with alumina (excluding titanium oxide particles having surfaces treated with an organic compound, silica, zirconia, zinc oxide, or magnesium oxide), and titanium oxide particles having surfaces treated with alumina and an organic compound.

As used herein, the phrase "titanium oxide particles having surfaces treated with alumina" refers to titanium oxide particles having surfaces at least partially coated with an aluminum oxide hydrate. However, titanium oxide particles having surfaces treated with an organic compound, silica, zirconia, zinc oxide, or magnesium oxide are not included. The titanium oxide particles having surfaces treated with alumina are widely known to those skilled in the art and are available as a commercial product. Examples of the commercial product include TIPAQUE CR-50, CR-58, CR-60, R-630, or R-680 manufactured by ISHIHARA SANGYO KAISHA, LTD.; JR-301, JR-405, JR-600A, JR-600E, or JR-605 manufactured by TAYCA CORPORATION; A-190, A-197, R-25, R-32, R-5N, or R-42 manufactured by SAKAI CHEMICAL INDUSTRY CO., LTD.; Ti-Pure R-101, R-103, R-104, R-108, or R-900 manufactured by The Chemours Company.

Furthermore, the phrase "titanium oxide particles having surfaces treated with alumina and an organic compound" refers to titanium oxide particles having surfaces at least partially coated with an aluminum oxide hydrate and an organic compound. Examples of the organic compound include a polyhydric alcohol, a fatty acid, an organosiloxane compound, a silane coupling agent, etc. Specifically, glycerin, diglycerin, trimethylolmethane, trimethylolethane, trimethylolpropane, dimethylethanolamine, triethanolamine, stearic acid, isostearic acid, oleic acid, dimethylpolysilozane, vinyltrimethoxysilane, vinyltriethoxysilane, etc. may be used. The titanium oxide particles having surfaces treated with alumina and an organotin compound are widely known to those skilled in the art and are available as a commercial product. Examples of the commercial product include TIPAQUE CR-50-2, CR-58-2, or CR-60-2, manufactured by ISHIHARA SANGYO KAISHA, LTD.; 2064, 2066, 2075, 2076, 2160, 2190, 2225, 2300, 2310, 2360, 2365, 2450, 2800, or 2900 manufactured by KRONOS; etc.

A crystal structure of titanium oxide includes a rutile (tetragonal) type, an anatase (tetragonal) type, or a brookite (orthorhombic) type, with rutile type titanium oxide being preferred from the viewpoint of crystal stability, a hiding property, and availability.

An average particle size of the white pigment is preferably 200 to 400 nm, more preferably 210 to 350 nm, and further preferably 250 to 350 nm. Note that, as used herein, the phrase "average particle size" means a particle size at a 50% integration value in a particle size distribution as determined by a laser diffraction/scattering method.

A content of the white pigment is preferably 5 to 30% by mass, more preferably 8 to 25% by mass, and further preferably 10 to 20% by mass relative to a total amount of an ink.

[Block Polymer Type Resin Dispersing Agent]

A block polymer means a copolymer in which two or more kinds of blocks each constituted of at least one kind of addition polymerizable monomer are chemically bonded together. When a block is constituted of a plurality of monomers, a bonding order of the plurality of monomers may be arbitrary. For example, if a block is constituted of a monomer A and a monomer B, the bonding order may be "AAA . . . BBB.", "ABABAB . . . " or otherwise.

A block polymer type resin dispersing agent may be synthesized or is available as a commercial product.

Examples of the block polymer type resin dispersing agent obtained by synthesis include the A-B block polymer disclosed in PCT International Publication No. WO2013/115071 or WO2022/025166.

The monomer constituting the block A of the A-B block polymer disclosed in PCT International Publication No. WO2013/115071 is at least one monomer selected from (meth)acrylic acid or linear or branched C4 alkyl (meth) acrylate, preferably at least one monomer selected from methacrylic acid or n-butyl methacrylate, and more preferably a combination of these two monomers. The monomer constituting the block B of the A-B block polymer disclosed in PCT International Publication No. WO2013/115071 is at least one monomer selected from benzyl methacrylate and benzyl acrylate and preferably benzyl methacrylate. Specific examples thereof include the block copolymers disclosed in Synthesis Examples 3 to 8 of PCT International Publication No. WO2013/115071.

The monomer constituting the block A of the A-B block polymer disclosed in WO2022/025166 is (meth)acrylic acid and butyl (meth)acrylate and preferably a combination of methacrylic acid and n-butyl methacrylate. A content of (meth)acrylic acid in a total mass of the monomer constituting the block A is usually 26 to 42% by mass and preferably 31 to 40% by mass. The monomer constituting the block B of the A-B block polymer disclosed in PCT International Publication No. WO2022/025166 includes cyclohexyl (meth)acrylate and preferably cyclohexyl methacrylate. A content of cyclohexyl. (meth)acrylate in a total mass of the monomer constituting the block B is usually 80 to 100% by mass and preferably 90 to 99.8% by mass. The monomer constituting the block B may include (meth) acrylic acid as an additional monomer. A content of (meth) acrylic acid in a total mass of the monomer constituting the block B is usually 0.1 to 10% by mass and preferably 0.5 to 5% by mass. Specific examples thereof include the block copolymer disclosed in Synthesis Examples 1 to 10, 18, or 19 of PCT International Publication No. WO2022/025166.

Examples of the block polymer type resin dispersing agent that is available as a commercial product include DISPERBYK 2010 (acid value: 20 mgKOH/g, amine value: 20 mgKOH/g), 2012 (acid value: 7 mgKOH/g, amine value: 7 mgKOH/g), 2015 (acid value: 10 mgKOH/g), BYKJET-9151 (acid value: 8 mgKOH/g, amine value: 18 mgKOH/g), or 9171 (amine value: 28 mgKOH/g) manufactured by BYK; Dispex Ultra PX 4575 (amine value: 32 mgKOH/g) or 4585 (amine value: 20 mgKOH/g) manufactured by BASF; AFCONA-4597 (acid number: 10 mg KOH/g, amine number: 13 mg KOH/g) or AFCONA-4598 (acid number: 11 mg KOH/g) manufactured by AFCONA, etc.

A mass average molecular weight of the block polymer type resin dispersing agent is preferably 10000 to 30000 and more preferably 15000 to 25000. A mass average molecular weight of the dispersing agent can be measured by a gel permeation chromatographic (GPC) method. Specifically, the mass average molecular weight can be measured using HLC-8320 (manufactured by Tosoh Corporation) as a GPC device, two TSK gel Super Multipore HZ-H columns (manufactured by Tosoh Corporation, inner diameter: 4.6 mm×15 cm) as a column, tetrahydrofuran as an eluent, and TSK Standard (manufactured by Tosoh Corporation) as a standard sample.

An ink according to the present embodiment preferably contains particles in which at least a portion of a surface of a white pigment is coated with the block polymer type resin dispersing agent. In this case, an average particle size of the particles is preferably 200 to 400 nm, more preferably 200 to 350 nm, and further preferably 250 to 320 nm.

A content of the block polymer type resin dispersing agent is preferably 0.07 to 0.15 times by mass and more preferably 0.085 to 0.130 times by mass relative to a content of the white pigment.

[Organic Solvent]

Examples of an organic solvent include a C1-C6 alkanol such as methanol, ethanol, propanol, isopropanol, butanol, isobutanol, sec-butanol, or tert-butanol; a carboxylic acid amide such as N, N-dimethylformamide or N, N-dimethylacetamide; a lactam such as 2-pyrrolidone, N-methyl-2-pyrrolidone, or N-methylpyrrolidin-2-one; a cyclic urea such as 1,3-dimethylimidazolidin-2-one or 1,3-dimethylhexahydropyrimid-2-one; a ketone, a keto alcohol, or a carbonate such as acetone, 2-methyl-2-hydroxypentan-4-one, or ethylene carbonate; a cyclic ether such as tetrahydrofuran or dioxane; a mono-, oligo-, or poly-alkylene glycol or thioglycol having a C2-C6 alkylene unit such as ethylene glycol, diethylene glycol, propylene glycol, 1,2-butylene glycol, 1,4-butylene glycol, diethylene glycol, triethylene glycol, tetraethylene glycol, dipropylene glycol, polyethylene glycol (preferably with a molecular weight of 400, 800, 1540, or more), polypropylene glycol, thiodiglycol, or dithiodiglycol; a C3-C9 polyol (triol) such as glycerin, diglycerin, hexan-1,2,6-triol, or trimethylolpropane; a glycol ether such as ethylene glycol monomethyl ether, ethylene glycol monoethyl ether, ethylene glycol monoallyl ether, ethylene glycol monoisopropyl ether, diethylene glycol monomethyl ether, diethylene glycol monoethyl ether, diethylene glycol monobutyl ether (butylcarbitol), triethylene glycol monomethyl ether, triethylene glycol monoethyl ether, triethylene glycol monobutyl ether, propylene glycol monopropyl ether, proylene glycol monobutyl ether, dipropylene glycol monopropyl ether, dipropylene glycol monomethyl ether, diethylene glycol phenyl ether, or 3-methoxy-1-butanol (preferably a glycol ether selected from the group consisting of a C4-C10 mono-, di-, or tri-ethylene glycol ether and a C4-C13 mono-, di-, or tripropylene glycol ether); a C5-C9 alkanediol such as 1,2-pentanediol, 1,5-pentanediol, 1,2-hexanediol, 1,6-hexanediol, 2-methyl-2,4-pentanediol, 2-ethyl-1,3-hexanediol, or 2,4-diethyl-1,5-pentanediol; γ-butyrolactone; dimethyl sulfoxide; etc. Among them, those with a boiling point of 130° C. or more at atmospheric pressure are preferred, and those with a boiling point of 150 to 300° C. at atmospheric pressure are more preferred.

A content of the organic solvent is preferably 1 to 30% by mass, more preferably 3 to 20% by mass, and further preferably 5 to 15% by mass relative to a total amount of an ink.

[Water]

Water with a low content of an impurity such as a metal ion, i.e., ion-exchanged water, distilled water, etc., is preferred.

A content of the water is preferably 50 to 90% by mass, more preferably 60 to 85% by mass, and further preferably 70 to 80% by mass relative to a total amount of an ink.

[Surfactant]

An ink according to the present embodiment preferably further contains a surfactant. The surfactant includes an anionic surfactant, a nonionic surfactant, a silicone surfactant, or a fluorinated surfactant. Among them, a silicone surfactant or a fluorinated surfactant is preferred and a silicone surfactant is more preferred from the viewpoint of biological and environmental safety.

Examples of the anionic surfactant include alkyl sulfocarboxylate, α-olefin sulfonate, polyoxyethylene alkyl ether acetate, polyoxyethylene alkyl ether sulfate, an N-acyl amino acid or a salt thereof, an N-acyl-methyltaurine salt, alkyl sulfate polyoxyalkyl ether sulfate, alkyl sulfate polyoxyethylene alkyl ether phosphate, a rosin acid soap, a castor oil sulfate ester salt, a lauryl alcohol sulfate ester salt, an alkylphenol-based phosphate ester, an alkyl-based phosphate ester, an alkylaryl sulfonate, diethyl sulfosuccinate, diethyl hexylsulfosuccinate, dioctyl sulfosuccinate, etc.

Examples of the nonionic surfactant include an ether nonionic surfactant such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether, or polyozyethylene distyrenated phenyl ether (e.g., A-60, A-90, or A-500 manufactured by Kao Corporation); an ester nonionic surfactant such as polyoxyethylene oleate, polyoxyethylene distearate, sorbitan laurate, sorbitan monostearate, sorbitan monooleate, sorbitan sesquioleate, polyoxyethylene monooleate, or polyoxyethylene stearate; an acetylene glycol (or acetylene alcohol) nonionic surfactant such as 2,4,7,9-tetramethyl-5-decyne-4,7-diol, 3,6-dimethyl-4-octyne-3,6-diol, or 3,5-dimethyl-1-hexyn-3-ol (e.g., Surfynol 104, 104PG50, 82, 420, 440, 465 or 485, or OLFINE STG manufactured by Nissin Chemical Industry Co., Ltd.); a polyglycol ether nonionic surfactant; and the like.

Examples of the silicone surfactant include polyether-modified siloxane, polyether-modified polydimethylsiloxane, etc. Examples of a commercial product thereof include Dynol 960 ox 980 manufactured by Air Products and Chemicals, Inc.; Silface SAG001, SAG002, SAG003, SAG005, SAG503A, SAG008, SAG009, or SAG010 from Nissin Chemical Industry Co., Ltd.; BYK-345, 347, 348, 349, 3450, or 3455 manufactured by BYK Additives & Instruments; TEGO Twin 4000, TEGO Wet KL 245, 250, 260, 265, 270, or 280 manufactured by Evonic Tego Chemie; etc.

Examples of the fluorinated surfactant include a perfluoroalkylsulfonic acid compound, a perfluoroalkylcarboxylic acid compound, a perfluoroalkylphosphoric acid ester compound, a perfluoroalkylethylene oxide adduct, a polyoxyalkylene ether polymer compound having a perfluoroalkyl ether group in a side chain thereof, etc. Specific examples of a commercial product thereof include Capstone FS-30 or FS-31 manufactured by The Chemours Company.

When an ink according to the present embodiment contains a surfactant, a content thereof is preferably 0.20 to 3.00% by mass and more preferably 0.50 to 1.50% by mass relative to a total amount of the ink.

[Fixing Resin]

An ink according to the present embodiment preferably further includes a fixing resin. Inclusion of the fixing resin in the ink according to the present embodiment tends to improve image robustness such as water resistance, abrasion resistance, or alcohol resistance of an image printed on a recording medium. The fixing resin is preferably at least one selected from a polymer or a wax. However, a block polymer type resin dispersing agent is not included in the fixing resin.

Examples of the polymer include a urethane polymer, a polyester polymer, an acrylic polymer, a vinyl acetate polymer, a vinyl chloride polymer, a styrene-acrylic polymer, an acrylic-silicone polymer, or a styrene-butadiene polymer. Among them, a polymer selected from a urethane polymer, an acrylic polymer, or a styrene-butadiene polymer is preferred, a urethane polymer or an acrylic polymer is more preferred, and an acrylic polymer is further preferred.

The polymer is available as a commercial product in a polymer emulsion form. Examples of the commercial product in a polymer emulsion form include SUPERFLEX 420, 470, or 890 (urethane resin emulsion manufactured by DKS Co. Ltd.); HYDRAN HW-350, HW-178, HW-163, HW-171, AP-20, AP-30, WLS-201, ox WLS-210 (urethane resin emulsion manufactured by DIC Corporation); 0569, 0850Z, or 2108 (styrene-butadiene resin emulsion manufactured by JSR Corporation); AE980, AE981A, AE982, AE986B, or AE104 (acrylic resin emulsion manufactured by Emulsion Technology Co., Ltd.); CARBOSET 560 (acrylic resin emulsion manufactured by Lubrizol Corporation); etc.

The wax may be a natural waz or a synthetic waz.

Examples of the natural wax include a petroleum wax such as a paraffin wax or a microcrystalline wax; a lignite wax such as a montan wax; a plant wax such as a carnauba wax or a candelilla wax; an animal and plant wax such as a beeswax or lanolin; etc.

Examples of the synthetic wax include a polyalkylene wax (preferably, poly-C2-C4-alkylene wax), an oxidized polyalkylene wax (preferably, oxidized poly-C2-C4-alkylene wax), a paraffin wax, etc. Among them, a polyethylene wax, a polypropylene wax, an oxidized polyethylene wax, an oxidized polypropylene wax, or paraffin wax is preferred.

An average particle size of the wax is preferably 50 nm to 5 μm and more preferably 100 nm to 1 μm in order to prevent clogging of an inkjet head.

The wax is available as a commercial product in a wax emulsion form. Examples of the commercial product in a wax emulsion form include CERAFLOUR 925, 929, 950, or 991, AQUACER 498, 515, 526, 531, 537, 539, 552, or 1547 AQUAMAT 208, 263, or 272, or MINERPOL 221 (manufactured by BYK) Mitsui Hi-WAX NL100, NL200, NL500, 4202E, 1105A, 2203A, NP550, NP055, or NP505 (manufactured by Mitsui Chemicals, Inc.); KUE-100 or 11 (manufactured by Sanyo Chemical Industrial Co., Ltd.); HYTEC E-6500, 9015, or 6400 (manufactured by TOHO Chemical Industry Co., Ltd.); etc.

When an ink according to the present embodiment contains a fixing resin, a content thereof is preferably 1 to 20% by mass and more preferably 3 to 10% by mass relative to a total amount of the ink according to the present embodiment. When the content of the fixing resin is 1% by mass or more, the ink tends to show a good fixing property to a recording medium. Furthermore, when the content of the fixing resin is 20% or less by mass, dischargeability and storage stability of the ink tend to be better.

In particular, the ink according to the present embodiment preferably contains both a polymer (preferably an acrylic polymer) and a wax as the fixing resin. In this case, a content of the polymer is preferably 1 to 10% by mass and more preferably 3 to 8% by mass relative to a total amount of the ink. A content of the wax is preferably 3% by mass or less and more preferably 0.05 to 1.00% by mass relative to a total amount of an ink.

[Ink Preparation Agent]

An ink according to the present embodiment may further contain an ink preparation agent in addition to the above-mentioned components. Examples of the ink preparation agent include a fungicide, a preservative, a pH adjuster, a chelating reagent, a corrosion inhibitor, an antifoaming agent, a water-soluble UV absorber, an antioxidant, etc. Note that, a content of each ink preparation agent can be arbitrarily set depending on an application of the ink.

(Fungicide)

Examples of the fungicide include sodium dehydroacetate, sodium benzoate, sodium pyridinethione-1-oxide, p-hydroxybenzoic acid ethyl ester, 1,2-benzisothiazolin-3-one and a salt thereof, etc.

(Preservative)

Examples of the preservative include an organosulfur compound, an organic nitrogen-sulfur compound, an organic halogen compound, a haloaryl sulfone compound, an iodopropargyl compound, a haloalkylthio compound, a nitrile compound, a pyridine compound, an 8-oxyquinoline compound, a benzothiazole compound, an isothiazoline compound, a dithiol compound, a pyridine oxide compound, a nitropropane compound, an organic tin compound, a phenol compound, a quaternary ammonium salt compound, a triazine compound, a thiazine compound, an anilide compound, an adamantane compound, a dithiocarbamate compound, a brominated indanone compound, a benzyl bromoacetate compound, an inorganic salt compound, etc. Specific examples of the organic halogen compound include sodium pentachlorophenol, etc. Specific examples of the pyridine oxide compound include sodium 2-pyridinethiol-1-oxide, etc. Specific examples of the isothiazoline compound include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride, etc. Specific examples of other preservative fungicides include anhydrous sodium acetate, sodium sorbate, sodium benzoate; Proxel GXL(S), Proxel LV, or Proxel XL-2 (S) (manufactured by Arch Chemicals, Inc.), etc.

(pH Adjuster)

Examples of the pH adjuster include an alkanolamine such as diethanolamine, triethanolamine, or N-methyldiethanolamine; an alkali metal hydroxide such as lithium hydroxide, sodium hydroxide, or potassium hydroxide; ammonium hydroxide (aqueous ammonia); an alkali metal carbonate such as lithium carbonate, sodium carbonate, or potassium carbonate; an alkali metal salt of an organic acid such as potassium acetate; an inorganic base such as sodium silicate or disodium phosphate; etc.

(Chelating Reagent)

Examples of the chelating reagent include disodium ethylenediaminetetraacetate, sodium nitrilotriacetate, sodium hydroxyethylethylenediaminetriacetate, sodium diethylenetriaminepentaacetate, sodium uracil diacetate, etc.

(Corrosion Inhibitor)

Examples of the corrosion inhibitor include acidic sulfite, sodium thiosulfate, ammonium thioglycolate, diisopropylammonium nitrite, pentaerythritol tetranitrate, dicyclohexylammonium nitrite, etc.

(Antifoaming Agent)

Examples of the antifoaming agent include a compound such as a silicone compound, a silica mineral oil compound, an olefin compound, or an acetylene compound. Examples of commercially available antifoaming agent include Surfynol DF37, DF58, DF110D, DE220, MD-20, or OLFINE SK-14 (manufactured by Nissin Chemical Industry Co., Ltd.), etc.

(Water-Soluble UV Absorber)

Examples of the water-soluble UV absorber include a sulfonated benzophenone compound, a benzotriazole compound, a salicylic acid compound, a cinnamic acid compound, a triazine compound, etc.

(Antioxidant)

For example, various organic or metal-complex anti-fading agents may be used as the antioxidant. Examples of the organic anti-fading agent include a hydroquinone, an alkoxyphenol, a dialkoxyphenol, a phenol, an aniline, an amine, an indane, a chromane, an alkoxyaniline, a heterocycle, etc.

<Method for Producing Inkjet Ink>

Any known production method can be employed as a method for producing an ink according to the present embodiment. One example thereof includes a method in which an aqueous dispersion liquid is prepared using a white pigment and a block polymer type resin dispersing agent, and then water, an organic solvent, and other components as necessary are added to and mixed with the dispersion liquid.

Examples of a method for preparing the dispersion liquid include a phase inversion emulsification method, an acid deposition method, an interfacial polymerization method, an in-situ polymerization method, a submerged cured film method, a coacervation (phase separation) method, a liquid drying method, a melt dispersion cooling method, an air suspension coating method, a spray drying method, etc. Among them, a phase inversion emulsification method, an acid deposition method, or an interfacial polymerization method is preferred.

The method for producing an ink according to the present embodiment preferably includes coating at least a portion of a surface of a white pigment with a block polymer type resin dispersing agent. Thus, a dispersion liquid containing particles in which at least a portion of the surface of the white pigment is coated with the block polymer type resin dispersing agent can be obtained.

One example of a method for coating at least a portion of the surface of the white pigment with the block polymer type resin dispersing agent includes a phase inversion emulsification method. When the dispersion liquid is prepared by the phase inversion emulsification method, for example, an emulsified liquid is prepared by dissolving a block polymer type resin dispersing agent in an organic solvent such as 2-butanone and adding an aqueous solution of a neutralizing agent thereto. A white pigment is added to the resulting emulsified liquid and subjected to a dispersion treatment. The organic solvent and a portion of water can be distilled off from the thus-obtained liquid under reduced pressure to obtain a dispersion liquid of interest.

Examples of the neutralizing agent include an inorganic base such as an alkali metal hydroxide, an alkaline earth metal hydroxide, or ammonia; an organic base such as an aliphatic amine compound or an alkanolamine compound; etc. A neutralization rate of the block polymer type resin dispersing agent is preferably 150% or less and more preferably 70 to 130% taking a neutralization rate when neutralized with an theoretical equivalent of an acid value of the block polymer type resin dispersing agent as 100%.

The dispersion treatment can be performed using, for example, a sand mill (bead mill), a roll mill, a ball mill, a paint shaker, an ultrasonic dispersion device, a microfluidizer, etc. As an example, when using a sand mill, beads with a particle size of about 0.01 to 1 mm can be used to perform the dispersion treatment at an appropriately set filling rate of the beads. The dispersion liquid obtained as described above may be subjected to an operation such as filtration, centrifugation, etc. Such an operation allows a particle size of particles contained in the dispersion liquid to be uniform. If the dispersion liquid is foamed during preparation, a very small amount of a known antifoaming agent such as silicone or acetylene glycol may be added thereto.

An ink according to the present embodiment preferably contains only a small amount of an inorganic impurity such as a metal cation chloride (e.g., sodium chloride) or a metal sulfate (e.g., sodium sulfate). Such an inorganic impurity is often contained in a commercially available colorant. A standard content of the inorganic impurity is approximately 1% by mass or less relative to a total mass of the colorant, and a lower limit thereof is ideally a detection limit or lower of an analytical device, i.e., 0% by mass. Examples of a method for obtaining a colorant with a low inorganic impurity include a method using a reverse osmosis membrane; a method in which a colorant in a solid form is suspended and stirred in a mixed solvent of a C1-C4 alcohol such as methanol and water and a colored body is separated by filtering and then dried; or a method of exchange adsorption of the inorganic impurity using an ion exchange resin; etc.

An ink according to the present embodiment is preferably microfiltrated in advance. A membrane filter, glass filter paper, etc. can be used for microfiltration. A pore size of a filter for use in microfiltration is usually 0.5 to 20 μm and preferably 0.5 to 10 μm.

<Inkjet Recording Method>

An inkjet recording method according to the present embodiment includes recording by ejecting droplets of the ink according to the present embodiment as described above from an inkjet printer and adhering the droplets to a recording medium. An ink nozzle for ejecting an ink of the inkjet printer is not particularly limited and may be appropriately selected depending on the purpose.

The inkjet recording method according to the present embodiment also includes a method for improving image quality by ejecting a large number of droplets with a small volume of an ink with a low content of a colorant; a method for improving image quality by using a plurality of inks with substantially the same color tone but different contents of colorants in the inks; a method for improving a fixing property of a colorant on a recording medium by using a combination of a transparent and colorless ink with an ink containing a colorant; etc.

Any known inkjet recording method can be employed. Examples thereof include a charge control method, a drop-on-demand method (also referred to as a pressure pulse method), an acoustic inkjet method, a thermal inkjet method, etc. The inkjet recording method may be either a multi-pass method or a single-pass method (one-pass printing method). For an industrial inkjet printer, single-pass printing using a line-head inkjet printer is also preferred for the purpose of increasing a printing speed. The ink according to the present embodiment may be used to obtain a desired printed image even under such printing conditions.

A recording medium is not particularly limited, and is preferably a less ink-absorbent or non-ink-absorbent recording medium, and more preferably a non-ink-absorbent recording medium. Examples of the less ink-absorbent recording medium include plain paper having no ink-receiving layer; a medium used for gravure printing, offset printing, etc.; art paper, coated paper, matte paper, cast paper, etc. Examples of the non-ink-absorbent recording medium include a polyethylene terephthalate (PET) film, a polypropylene (PP) film, a vinyl chloride sheet, glass, rubber, etc.

When a recording medium having no ink-receiving layer is used, a surface modification treatment is also preferably performed. Examples of the surface modification treatment include a corona discharge treatment, a plasma treatment, ox a flame treatment. It is generally known that an effect of the surface modification treatment decreases over time. For this reason, the surface modification treatment and inkjet recording are preferably performed consecutively, and the surface modification treatment is preferably performed immediately before inkjet recording.

When recording on a recording medium, for example, recording can be performed by loading a container containing an ink (ink tank) in an inkjet printer in place and printing on the recording medium using the above-mentioned recording method. Note that, full-color printing can also be performed by loading a container containing an ink of each color into an inkjet printer in place and printing on the recording medium using the above-mentioned recording method.

With respect to all the above-mentioned features, a combination of preferred features is more preferred, and a combination of more preferred features is further preferred. The same applies to a combination of a preferred feature and a more preferred feature, a combination of a more preferred feature and further preferred feature, or the like.

EXAMPLES

Hereinafter, the present invention will be described in detail with reference to Examples, but the present invention is not limited by Examples.

In Examples, the term "part(s)" means part(s) by mass and the term "%" means & by mass, unless otherwise specified. A solid content of a pigment in a dispersion liquid was quantified according to a dry weight method using MS-70 manufactured by A&D Company, Limited, if needed. The solid content of the pigment is a converted value obtained by calculating only the solid content of the pigment from a total solid content.

Furthermore, abbreviations used in Examples mean as follows.

CR-60-2: TIPAQUE CR-60-2 (manufactured by ISHIHARA SANGYO KAISHA, LTD.)
CR-50-2: TIPAQUE CR-50-2 (manufactured by ISHIHARA SANGYO KAISHA, LTD.)
CR-58-2: TIPAQUE CR-58-2 (manufactured by ISHIHARA SANGYO KAISHA, LTD.)
CR-60: TIPAQUE CR-60 (manufactured by ISHIHARA SANGYO KAISHA, LTD.)
CR-50: TIPAQUE CR-50 (manufactured by ISHIHARA SANGYO KAISHA, LTD.)
CR-58: TIPAQUE CR-58 (manufactured by ISHIHARA SANGYO KAISHA, LTD.)
K2066: KRONOS 2066 (manufactured by KRONOS)
K2300: KRONOS 2300 (manufactured by KRONOS)
CR-85: TIPAQUE CR-85 (manufactured by ISHIHARA SANGYO KAISHA, LTD.)
PFC208: TIPAQUE PFC208 (manufactured by ISHIHARA SANGYO KAISHA, LTD.)
B2012: DISPERBYK 2012 (manufactured by BYK, mass average molecular weight: 21000, solid content: 40%)
D4575: Dispex Ultra PX 4575 (manufactured by BASF, mass average molecular weight: 16000, solid content: 40%)
W150: SOLSPERSE W150 (manufactured by Lubrizol Corporation, mass average molecular weight: 18000, solid content: 100%)
JC60J: JONCRYL 60J (manufactured by BASF, mass average molecular weight: 8500, solid content: 33.9%)
TEA: Triethanolamine
DF58: Surfynol DF-58 (manufactured by Nissin Chemical Industry Co., Ltd.)
ROCIMA: ROCIMA 640 (manufactured by The Dow Chemical Company)
DEGPH: Diethylene glycol phenyl ether (boiling point: 298° C.)
PG: Propylene glycol (boiling point: 188° C.)
1,5PD: 1,5-Pentanediol (boiling point: 239° C.)
MB: 3-Methoxy-1-butanol (boiling point: 158° C.)
B3450: BYK-3450 (manufactured by BYK, silicone surfactant)
SF440: Surfynol 440 (manufactured by Nissin Chemical Industry Co., Ltd., acetylene diol surfactant)
WLS-210: HYDRAN WLS-210 (manufactured by DIC Corporation, urethane resin emulsion, solid content: 35%)
C560: CARBOSET 560 (manufactured by Lubrizol Corporation, acrylic resin emulsion, solid content: 27%)
AQ515: AQUACER 515 (manufactured by BYK, polyethylene waz emulsion, solid content: 35%)

<Preparation of Dispersion Liquid>

Preparation Example 1: Preparation of Dispersion Liquid 1

A polymer dispersing agent A was obtained by following Synthesis Example 3 of PCT International Publication No. WO 2013/115071. The resulting polymer dispersing agent A had an acid number of 104 mg KOH/g and a mass average molecular weight of 22000. The polymer dispersing agent A (7.5 parts) was dissolved in 2-butanone (30.0 parts) to obtain a uniform solution. A solution of 28% aqueous ammonia (0.8 parts), DF58 (1.2 parts), ROCIMA (0.8 parts), and DEGPH (3.8 parts) dissolved in ion-exchanged water (31.0 parts) was added to the uniform solution and stirred for 1 hour to obtain an emulsified liquid in which the polymeric dispersing agent was dissolved. CR-60-2 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 1 with a pigment solid content of 40%.

Preparation Examples 2 to 8: Preparation of Dispersion Liquids 2 to 8

Dispersion liquids 2 to 8 were obtained in the same manner as in Preparation Example 1, except that CR-50-2, CR-58-2, CR-60, CR-50, CR-58, K2066, and K2300 were used instead of CR-60-2 as the white pigment.

Preparation Example 9: Preparation of Dispersion Liquid 3

A polymer dispersing agent B was obtained by following Synthesis Example 9 of PCT International Publication No. WO 2022/025166. The resulting polymer dispersing agent B had an acid number of 128 mg KOH/g and a mass average molecular weight of 18000. The polymer dispersing agent B (7.5 parts) was dissolved in 2-butanone (30.0 parts) to obtain a uniform solution. A solution of 28% aqueous ammonia (1.0 part), DF58 (1.2 parts), ROCIMA (0.8 parts), and DEGPH (3.8 parts) dissolved in ion-exchanged water (30.8 parts) was added to the uniform solution and stirred for 1 hour to obtain an emulsified liquid in which the polymeric dispersing agent was dissolved. CR-50-2 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 9 with a pigment solid content of 408.

Preparation Example 10: Preparation of Dispersion Liquid 10

B2012 (18.8 parts) was added to a solution of 2-butanone (30.0 parts), DF58 (1.2 parts), ROCIMA (0.8 parts), and DEGPH (3.8 parts) dissolved in ion-exchanged water (20.5 parts) and stirred for 1 hour to obtain an emulsified liquid in which the polymeric dispersing agent was dissolved. CR-50-2 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 10 with a pigment solid content of 40%.

Preparation Example 11: Preparation of Dispersion Liquid 11

D4575 (18.8 parts) was added to a solution of 2-butanone (30.0 parts), DF58 (1.2 parts), ROCIMA (0.8 parts), and DEGPH (3.8 parts) dissolved in ion-exchanged water (20.5 parts) and stirred for 1 hour to obtain an emulsified liquid in which the polymeric dispersing agent was dissolved. CR-50-2 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 11 with a pigment solid content of 40%.

Preparation Example 12: Preparation of Dispersion Liquid 12

The polymer dispersing agent A (7.5 parts) obtained in Preparation Example 1 was dissolved in 2-butanone (30.0 parts) to obtain a uniform solution. A solution of TEA (2.1 parts), DF58 (1.2 parts), ROCIMA (0.8 parts), and DEGPH (3.8 parts) dissolved in ion-exchanged water (29.7 parts) was added to the uniform solution and stirred for 1 hour to obtain an emulsified liquid in which the polymeric dispersing agent was dissolved. CR-50-2 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 12 with a pigment solid content of 40%.

Preparation Example 13: Preparation of Dispersion Liquid 13

The polymer dispersing agent A (15.0 parts) obtained in Preparation Example 1 was dissolved in 2-butanone (38.0 parts) to obtain a uniform solution. A solution of 28% aqueous ammonia (1.7 parts) and DEGPH (7.5 parts) dissolved in ion-exchanged water (75.8 parts) was added to the uniform solution, and then 2-butanone and a portion of water were distilled off under reduced pressure in an evaporator with a water bath temperature of 55° C. to obtain a dispersing agent liquid with a concentration of the polymer dispersing agent A of 24.58. The dispersing agent liquid (30.6 parts) was added to a solution of DF58 (1.2 parts) and ROCIMA (0.8 parts) dissolved in ion-exchanged water (42.5 parts) and stirred for 1 hour to obtain an emulsified liquid in which the polymeric dispersing agent was dissolved. CR-50-2 (75.0 parts) was added to the emulsified liquid and dispersed in a sand grinder at 1500 rpm for 15 hours. Ion-exchanged water (20 parts) was added dropwise to the resulting liquid, and beads for dispersion were removed by filtration to obtain a dispersion liquid 13 with a pigment solid content of 408.

Preparation Example 14: Preparation of Dispersion Liquid 14

The polymer dispersing agent A (5.3 parts) obtained in Preparation Example 1 was dissolved in 2-butanone (30.0 parts) to obtain a uniform solution. A solution of 28% aqueous ammonia (0.7 parts), DF58 (1.2 parts), and ROCIMA (0.8 parts) dissolved in ion-exchanged water (59.8 parts) was added to the uniform solution and stirred for 1 hour to obtain an emulsified liquid in which the polymeric dispersing agent was dissolved. CR-50-2 (52.5 parts) was added to the emulsified liquid and dispersed in a sand grinder at 1500 rpm for 15 hours. Ion-exchanged water (10 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 14 with a pigment solid content of 40%.

Preparation Example 15: Preparation of Dispersion Liquid 15

The polymer dispersing agent A (7.5 parts) obtained in Preparation Example 1 was dissolved in 2-butanone (22.5 parts) to obtain a uniform solution. A solution of 28% aqueous ammonia (0.8 parts), DF58 (1.2 parts), ROCIMA (0.8 parts), and DEGPH (5.3 parts) dissolved in ion-exchanged water (37.0 parts) was added to the uniform solution and stirred for 1 hour to obtain an emulsified liquid in which the polymeric dispersing agent was dissolved. K2300 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 15 with a pigment solid content of 40%.

Preparation Example 16: Preparation of Dispersion Liquid 16

The polymer dispersing agent A (9.8 parts) obtained in Preparation Example 1 was dissolved in 2-butanone (22.5 parts) to obtain a uniform solution. A solution of 28% aqueous ammonia (0.8 parts), DF58 (1.2 parts), ROCIMA (0.8 parts), and DEGPH (5.3 parts) dissolved in ion-exchanged water (34.7 parts) was added to the uniform solution and stirred for 1 hour to obtain an emulsified liquid in which the polymeric dispersing agent was dissolved. K2300 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 16 with a pigment solid content of 40%.

Preparation Example 17: Preparation of Dispersion Liquid 17

The polymer dispersing agent A (9.8 parts) obtained in Preparation Example 1 was dissolved in 2-butanone (22.5 parts) to obtain a uniform solution. A solution of 28% aqueous ammonia (1.3 parts), DF58 (1.2 parts), ROCIMA (0.8 parts), and DEGPH (5.3 parts) dissolved in ion-exchanged water (34.2 parts) was added to the uniform solution and stirred for 1 hour to obtain an emulsified liquid in which the polymeric dispersing agent was dissolved. K2300 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 17 with a pigment solid content of 40%.

Preparation Example 18: Preparation of Dispersion Liquid 18

The polymer dispersing agent A (6.4 parts) obtained in Preparation Example 1 was dissolved in 2-butanone (22.5 parts) to obtain a uniform solution. A solution of 28% aqueous ammonia (0.5 parts), DF58 (1.2 parts), ROCIMA (0.8 parts), and DEGPH (5.3 parts) dissolved in ion-exchanged water (38.4 parts) was added to the uniform solution and stirred for 1 hour to obtain an emulsified liquid in which the polymeric dispersing agent was dissolved. K2300 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 18 with a pigment solid content of 40%.

Preparation Example 19: Preparation of Dispersion Liquid 19

The polymer dispersing agent A (6.4 parts) obtained in Preparation Example 1 was dissolved in 2-butanone (22.5 parts) to obtain a uniform solution. A solution of 288 aqueous ammonia (0.9 parts), DF58 (1.2 parts), ROCIMA (0.8 parts), and DEGPH (5.3 parts) dissolved in ion-exchanged water (38.0 parts) was added to the uniform solution and stirred for 1 hour to obtain an emulsified liquid in which the polymeric dispersing agent was dissolved. K2300 (75.0 parts) was added to the emulsified liquid and dispersed in a sand grinder at 1500 rpm for 15 hours. Ion-exchanged water (60 parts) was added dropwise to the resulting liquid, beads for dispersion were removed by filtration, and then 2-butanone and a portion of water were distilled off under reduced pressure in an evaporator with a water bath temperature of 55° C. to obtain a dispersion liquid 19 with a pigment solid content of 40%.

Preparation Examples 20 and 21: Preparation of Dispersion Liquids A and B

Dispersion liquids A and B were obtained in the same manner as in Preparation Example 1, except that CR-85 and PEC208 were used instead of CR-60-2 as the white pigment.

Details of the dispersion liquids 1 to 19 and the dispersion liquids A and B are shown in Tables 1 to 3 below.

TABLE 1

| | | Preparation Example | | | | | | |
|---|---|---|---|---|---|---|---|---|
| | | 1 | 2 | 3 | 4 | 5 | 6 | 7 |
| | | Dispersion liquid | | | | | | |
| | | 1 | 2 | 3 | 4 | 5 | 6 | 7 |
| White pigment | Product name | CR-60-2 | CR-50-2 | CR-58-2 | CR-60 | CR-50 | CR-58 | K2066 |
| | Surface treatment | Alumina Organic | Alumina Organic | Alumina Organic | Alumina — | Alumina — | Alumina — | Alumina Organic |
| | Average particle size (nm) | 210 | 250 | 280 | 210 | 250 | 280 | 330 |
| | Oil absorption (g/100 g) | 14 | 17 | 18 | 15 | 18 | 19 | 17 |
| Dispersing agent | Kind/Product name | Polymer dispersing agent A | Polymer dispersing agent A | Polymer dispersing agent A | Polymer dispersing agent A | Polymer dispersing agent A | Polymer dispersing agent A | Polymer dispersing agent A |

TABLE 1-continued

| | | Preparation Example 1 | 2 | 3 | 4 | 5 | 6 | 7 |
|---|---|---|---|---|---|---|---|---|
| | | Dispersion liquid 1 | 2 | 3 | 4 | 5 | 6 | 7 |
| | Structure | Block | Block | Block | Block | Block | Block | Block |
| | Mass ratio to white pigment | 0.100 | 0.100 | 0.100 | 0.100 | 0.100 | 0.100 | 0.100 |
| Neutralizing agent | Kind | Ammonia | Ammonia | Ammonia | Ammonia | Ammonia | Ammonia | Ammonia |
| | Neutralization rate | 100% | 100% | 100% | 100% | 100% | 100% | 100% |
| Average particle size of particles in dispersion liquid (nm) | | 213 | 283 | 254 | 223 | 261 | 294 | 258 |

TABLE 2

| | | Preparation Example 8 | 9 | 10 | 11 | 12 | 13 | 14 |
|---|---|---|---|---|---|---|---|---|
| | | Dispersion liquid 8 | 9 | 10 | 11 | 12 | 13 | 14 |
| White pigment | Product name | K2300 | CR-50-2 | CR-50-2 | CR-50-2 | CR-50-2 | CR-50-2 | CR-50-2 |
| | Surface treatment | Alumina Organic | Alumina Organic | Alumina Organic | Alumina Organic | Alumina Organic | Alumina Organic | Alumina Organic |
| | Average particle size (nm) | 350 | 250 | 250 | 250 | 250 | 250 | 250 |
| | Oil absorption (g/100 g) | 17 | 17 | 17 | 17 | 17 | 17 | 17 |
| Dispersing agent | Kind/Product name | Polymer dispersing agent A | Polymer dispersing agent B | B2012 | D4575 | Polymer dispersing agent A | Polymer dispersing agent A | Polymer dispersing agent A |
| | Structure | Block | Block | Block | Block | Block | Block | Block |
| | Mass ratio to white pigment | 0.100 | 0.100 | 0.100 | 0.100 | 0.100 | 0.100 | 0.100 |
| Neutralizing agent | Kind | Ammonia | Ammonia | — | — | TEA | Ammonia | Ammonia |
| | Neutralization rate | 100% | 100% | — | — | 100% | 100% | 100% |
| Average particle size of particles in dispersion liquid (nm) | | 227 | 232 | 274 | 349 | 281 | 247 | 290 |

TABLE 3

| | | Preparation Example 15 | 16 | 17 | 18 | 19 | 20 | 21 |
|---|---|---|---|---|---|---|---|---|
| | | Dispersion liquid 15 | 16 | 17 | 18 | 19 | A | B |
| White pigment | Product name | K2300 | K2300 | K2300 | K2300 | K2300 | CR-85 | PFC208 |
| | Surface treatment | Alumina Organic | Alumina Organic | Alumina Organic | Alumina Organic | Alumina Organic | Alumina Silica | Alumina Silica |
| | Average particle size (nm) | 350 | 350 | 350 | 350 | 350 | 250 | 250 |
| | Oil absorption (g/100 g) | 17 | 17 | 17 | 17 | 17 | 30 | 23 |
| Dispersing agent | Kind/Product name | Polymer dispersing agent A | Polymer dispersing agent A | Polymer dispersing agent A | Polymer dispersing agent A | Polymer dispersing agent A | Polymer dispersing agent A | Polymer dispersing agent A |
| | Structure | Block | Block | Block | Block | Block | Block | Block |
| | Mass ratio to white pigment | 0.100 | 0.130 | 0.130 | 0.085 | 0.085 | 0.100 | 0.100 |
| Neutralizing agent | Kind | Ammonia | Ammonia | Ammonia | Ammonia | Ammonia | Ammonia | Ammonia |
| | Neutralization rate | 100% | 75% | 125% | 75% | 125% | 100% | 100% |
| Average particle size of particles in dispersion liquid (nm) | | 258 | 257 | 239 | 245 | 230 | 290 | 327 |

<Preparation of Int>

Examples 1 to 3% and Comparative Examples 1 and 2: Preparation of Ink

Inks were prepared with compositions shown in Tables 4 to 8 below. A numerical value in a row of each component in Tables 4 to 8 below indicates an amount (in part (s)) of the component added, and a blank cell indicates no addition of the component.

TABLE 4

| | | Example | | | | | | |
|---|---|---|---|---|---|---|---|---|
| | | 1 | 2 | 3 | 4 | 5 | 6 | 7 |
| Dispersion liquid | Kind | Dispersion liquid 1 | Dispersion liquid 2 | Dispersion liquid 3 | Dispersion liquid 4 | Dispersion liquid 5 | Dispersion liquid 6 | Dispersion liquid 7 |
| | Amount | 30.00 | 30.00 | 30.00 | 30.00 | 30.00 | 30.00 | 30.00 |
| PG | | 5.00 | 5.00 | 5.00 | 5.00 | 5.00 | 5.00 | 5.00 |
| 1,5PD | | | | | | | | |
| MB | | | | | | | | |
| B3450 | | 1.00 | 1.00 | 1.00 | 1.00 | 1.00 | 1.00 | 1.00 |
| SF440 | | | | | | | | |
| TEA | | 0.20 | 0.20 | 0.20 | 0.20 | 0.20 | 0.20 | 0.20 |
| WLS-210 | | 17.14 | 17.14 | 17.14 | 17.14 | 17.14 | 17.14 | 17.14 |
| C560 | | | | | | | | |
| AQ515 | | 2.86 | 2.86 | 2.86 | 2.86 | 2.86 | 2.86 | 2.86 |
| Purified water | | Balance | | | | | | |
| Total | | 100.0 | 100.0 | 100.0 | 100.0 | 100.0 | 100.0 | 100.0 |

TABLE 5

| | | Example | | | | | | |
|---|---|---|---|---|---|---|---|---|
| | | 8 | 9 | 10 | 11 | 12 | 13 | 14 |
| Dispersion liquid | Kind | Dispersion liquid 8 | Dispersion liquid 9 | Dispersion liquid 10 | Dispersion liquid 11 | Dispersion liquid 12 | Dispersion liquid 13 | Dispersion liquid 14 |
| | Amount | 30.00 | 30.00 | 30.00 | 30.00 | 30.00 | 30.00 | 30.00 |
| PG | | 5.00 | 5.00 | 5.00 | 5.00 | 5.00 | 5.00 | 5.00 |
| 1,5PD | | | | | | | | |
| MB | | | | | | | | |
| B3450 | | 1.00 | 1.00 | 1.00 | 1.00 | 1.00 | 1.00 | 1.00 |
| SF440 | | | | | | | | |
| TEA | | 0.20 | 0.20 | 0.20 | 0.20 | 0.20 | 0.20 | 0.20 |
| WLS-210 | | 17.14 | 17.14 | 17.14 | 17.14 | 17.14 | 17.14 | 17.14 |
| C560 | | | | | | | | |
| AQ515 | | 2.86 | 2.86 | 2.86 | 2.86 | 2.86 | 2.86 | 2.86 |
| Purified water | | Balance | | | | | | |
| Total | | 100.0 | 100.0 | 100.0 | 100.0 | 100.0 | 100.0 | 100.0 |

TABLE 6

| | | Example | | | | | | |
|---|---|---|---|---|---|---|---|---|
| | | 15 | 16 | 17 | 18 | 19 | 20 | 21 |
| Dispersion liquid | Kind | Dispersion liquid 2 | Dispersion liquid 2 | Dispersion liquid 2 | Dispersion liquid 2 | Dispersion liquid 15 | Dispersion liquid 15 | Dispersion liquid 15 |
| | Amount | 30.00 | 30.00 | 30.00 | 30.00 | 30.00 | 30.00 | 30.00 |
| PG | | | | 5.00 | 5.00 | | 5.00 | |
| 1,5PD | | 5.00 | | | | | 5.00 | 5.00 |
| MB | | | 5.00 | | | 10.00 | | 5.00 |
| B3450 | | 1.00 | 1.00 | | 1.00 | 1.00 | 1.00 | 1.00 |
| SF440 | | | | 1.00 | | | | |
| TEA | | 0.20 | 0.20 | 0.20 | 0.20 | 0.20 | 0.20 | 0.20 |
| WLS-210 | | 17.14 | 17.14 | 17.14 | | 17.14 | 17.14 | 17.14 |

TABLE 6-continued

| | | Example | | | | | | |
|---|---|---|---|---|---|---|---|---|
| | | 15 | 16 | 17 | 18 | 19 | 20 | 21 |
| C560 | | | | | 22.22 | | | |
| AQ515 | | 2.86 | 2.86 | 2.86 | 2.86 | 2.86 | 2.86 | 2.86 |
| Purified water | | Balance | | | | | | |
| Total | | 100.0 | 100.0 | 100.0 | 100.0 | 100.0 | 100.0 | 100.0 |

TABLE 7

| | | Example | | | | | | |
|---|---|---|---|---|---|---|---|---|
| | | 22 | 23 | 24 | 25 | 26 | 27 | 28 |
| Dispersion liquid | Kind | Dispersion liquid 15 | Dispersion liquid 15 | Dispersion liquid 15 | Dispersion liquid 15 | Dispersion liquid 15 | Dispersion liquid 16 | Dispersion liquid 17 |
| | Amount | 30.00 | 30.00 | 50.00 | 30.00 | 30.00 | 30.00 | 30.00 |
| PG | | 5.00 | | | | | 5.00 | 5.00 |
| 1,5PD | | | | | | | | |
| MB | | 5.00 | 5.00 | 5.00 | 5.00 | 5.00 | | |
| B3450 | | 1.00 | | | | | 1.00 | 1.00 |
| SF440 | | | 1.00 | 1.00 | 1.00 | 1.00 | | |
| TEA | | 0.20 | 0.20 | 0.20 | 0.20 | 0.20 | 0.20 | 0.20 |
| WLS-210 | | 17.14 | 17.14 | 17.14 | 8.57 | 25.71 | 17.14 | 17.14 |
| C560 | | | | | | | | |
| AQ515 | | 2.86 | 2.86 | 2.86 | 2.86 | 2.86 | 2.86 | 2.86 |
| Purified water | | Balance | | | | | | |
| Total | | 100.0 | 1.00.0 | 100.0 | 100.0 | 100.0 | 100.0 | 100.0 |

TABLE 8

| | | Example | | | | Comparative Example | |
|---|---|---|---|---|---|---|---|
| | | 29 | 30 | 31 | 32 | 1 | 2 |
| Dispersion liquid | Kind | Dispersion liquid 18 | Dispersion liquid 19 | Dispersion liquid 15 | Dispersion liquid 15 | Dispersion liquid A | Dispersion liquid B |
| | Amount | 30.00 | 30.00 | 30.00 | 30.00 | 30.00 | 30.00 |
| PG | | 5.00 | 5.00 | | | 5.00 | 5.00 |
| 1,5PD | | | | | | | |
| MB | | | | 5.00 | 5.00 | | |
| B3450 | | 1.00 | 1.00 | | | 1.00 | 1.00 |
| SF440 | | | | 1.00 | 1.00 | | |
| TEA | | 0.20 | 0.20 | 0.20 | 0.20 | 0.20 | 0.20 |
| WLS-210 | | 17.14 | 17.14 | | | 17.14 | 17.14 |
| C560 | | | | 11.11 | 33.33 | | |
| AQ515 | | 2.86 | 2.86 | 2.86 | 2.86 | 2.86 | 2.86 |
| Purified water | | Balance | | | | | |
| Total | | 100.0 | 100.0 | 100.0 | 100.0 | 100.0 | 100.0 |

<Evaluation>

The inks of Examples 1 to 32 and Comparative Example 1 were used for the below-mentioned evaluations. The results are shown in Tables 9 to 11 below. Note that, the ink of Comparative Example 2 was not evaluated due to gelation.

[Evaluation of Hiding Property]

A PET film (E5012, manufactured by TOYOBO CO., LTD.) was coated with each of the inks of Examples and Comparative Examples at a coating rate of 100 cm/s using an automatic coater (PI-1210, manufactured by TESTER SANGYO CO., LTD.) equipped with a bar coater (No. 4) and dried in a constant temperature oven. Note that, as a result of preliminary check, coating by the bar coater No. 4 corresponds to inkjet printing at a resolution of 1200 dpi, an ink droplet volume of 3 pL/dot, and 100% duty. The thus-coated film was placed on a piece of JIS standard test paper for hiding rate (TP Giken Co., Ltd.), and a Y value of the XYZ color system was measured on black and white surfaces using a spectral densitometer and colorimeter (x-Rite exact, manufactured by x-Rite). The measurement was repeated 3 times and an average value was determined. For colorimetry, a D50 light source, a viewing angle of 2 degrees, a status of ISO status T, no filter, and a white reference as an absolute value were used. Then, a hiding rate was calculated according to the following expression: Hiding rate (%)=Y value on black surface/Y value on white surface×100, and the hiding rate was evaluated based on the following evaluation criteria. Three or more is acceptable based on the following evaluation criteria.

—Evaluation Criteria—

4: Hiding rate of 50% or more

3: Hiding rate of 45% or more and less than 50%

2: Hiding rate of 40% or more and less than 45%

1: Hiding rate of less than 40%

[Evaluation of Dispersion Stability]

Each of the inks of the Examples and Comparative Examples was measured for viscosity using a viscometer (TV-35, manufactured by Toki Sangyo Co., Ltd) at a temperature of 25° C. and a rotation speed of 50 rpm. Each of the inks of Examples and Comparative Examples was tested using a dispersibility evaluation and measurement device (LUMiFuge 1112-131, manufactured by LUM GmbH) at a rotation speed of 1600 rpm for 45 minutes to determine an instability index. A cell used was 110-13101 manufactured by LUM GmbH. Since it is known that an interface migration velocity measured under actual storage conditions correlates with a sedimentation velocity, the instability index shall be taken as the sedimentation velocity herein. In order to correct for an effect of viscosity, the resulting value of the sedimentation velocity was multiplied by the viscosity to determine sedimentability, and dispersion stability was evaluated based on the following evaluation criteria. Three or more is acceptable based on the following evaluation criteria.

—Evaluating Criteria—

4: Sedimentability of 1.2 or less

3: Sedimentability of greater than 1.2 and 1.3 or less

2: Sedimentability of greater than 1.3 and 1.4 or less

1: Sedimentability of greater than 1.4

TABLE 9

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Hiding property | 3 | 3 | 4 | 3 | 3 | 4 | 4 | 4 | 4 | 3 | 3 |
| Dispersion stability | 4 | 4 | 3 | 4 | 4 | 4 | 4 | 4 | 3 | 4 | 4 |

TABLE 10

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| Hiding property | 4 | 3 | 3 | 3 | 3 | 3 | 4 | 4 | 4 | 4 | 4 |
| Dispersion stability | 3 | 4 | 4 | 4 | 4 | 4 | 4 | 4 | 4 | 4 | 4 |

TABLE 11

| | Example | | | | | | | | | | Comparative Example |
|---|---|---|---|---|---|---|---|---|---|---|---|
| | 23 | 24 | 25 | 26 | 27 | 28 | 29 | 30 | 31 | 32 | 1 |
| Hiding property | 4 | 4 | 4 | 4 | 4 | 4 | 4 | 4 | 4 | 4 | 4 |
| Dispersion stability | 4 | 4 | 4 | 4 | 4 | 4 | 3 | 4 | 4 | 4 | 1 |

As shown in Tables 9 to 11, the inks of Examples 1 to 32 including titanium oxide particles having surfaces treated with alumina or titanium oxide particles having surfaces treated with alumina and an organic compound serving as a white pigment and a block polymer type resin dispersing agent serving as a dispersing agent showed an excellent hiding property and dispersion stability.

In contrast, the ink of Comparative Example 1 including titanium oxide particles having surfaces treated with alumina and silica as a white pigment showed an excellent hiding property, but significantly poor dispersion stability.

The invention claimed is:

1. An inkjet ink comprising:

a white pigment;

a block polymer type resin dispersing agent having a mass average molecular weight of 15,000 to 25,000;

an organic solvent;

at least one polymer selected from the group consisting of urethane polymers and acrylic polymers;

a polyethylene wax as a fixing resin; and water, wherein the white pigment is at least one type of titanium oxide particles selected from the group consisting of titanium oxide particles having surfaces treated with alumina, provided that titanium oxide particles having surfaces treated with an organic compound, silica, zirconia, zinc oxide, or magnesium oxide are excluded, and titanium oxide particles having surfaces treated with alumina and an organic compound, and wherein a content of the polymer is 3 to 8% by mass and a content of the polyethylene wax is 0.05 to 3% by mass.

2. The inkjet ink according to claim 1, wherein the inkjet ink comprises particles of the white pigment having surfaces with at least a portion thereof coated with the block polymer type resin dispersing agent, and wherein the particles have an average particle size of 200 to 400 nm.

3. An inkjet recording method comprising recording by ejecting droplets of the inkjet ink according to claim 1 from an inkjet printer and adhering the droplets to a recording medium.

4. The inkjet recording method according to claim 3, wherein the recording medium is a less ink-absorbent or non-ink-absorbent recording medium.

5. The inkjet recording method according to claim 4, wherein the recording medium subjected to at least one surface modification treatment selected from the group consisting of a corona discharge treatment, a plasma treatment, and a flame treatment.

6. A recorded medium on which the inkjet ink according claim 1 has been adhered.

7. An inkjet printer comprising a container containing the inkjet ink according to claim 1.

8. A method for producing the inkjet ink according to claim 2, the method comprising coating at least the portion of the surface of the white pigment with the block polymer type resin dispersing agent.

* * * * *